(12) United States Patent
Tsutsumi

(10) Patent No.: US 6,285,510 B1
(45) Date of Patent: Sep. 4, 2001

(54) ZOOM LENS

(75) Inventor: Katsuhisa Tsutsumi, Kawagoe (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/510,497

(22) Filed: Feb. 22, 2000

(30) Foreign Application Priority Data

Feb. 26, 1999 (JP) .................................................. 11-049618

(51) Int. Cl.$^7$ ................................................ G02B 15/14
(52) U.S. Cl. ........................................... 359/688; 359/687
(58) Field of Search .................................. 359/687, 688, 359/686, 683, 676, 679

(56) References Cited

U.S. PATENT DOCUMENTS

| | | | |
|---|---|---|---|
| 4,892,397 | * | 1/1990 | Horiuchi ........................... 359/679 |
| 4,995,708 | * | 2/1991 | Sugiura ............................ 359/686 |
| 5,706,138 | * | 1/1998 | Abe et al. ........................ 359/688 |

FOREIGN PATENT DOCUMENTS

| | | |
|---|---|---|
| 7-35976 | 2/1995 | (JP) . |
| 8-129134 | 5/1996 | (JP) . |
| 8-136808 | 5/1996 | (JP) . |
| 10-161026 | 6/1998 | (JP) . |

* cited by examiner

Primary Examiner—Jordan M. Schwartz
(74) Attorney, Agent, or Firm—Arnold International; Bruce Y. Arnold

(57) ABSTRACT

A four-group zoom lens of positive, negative, positive or negative, and positive refractive power, respectively, is disclosed wherein the second lens group moves to vary the zoom ratio and the third lens group moves in order to keep the image surface at a fixed position during zooming, wherein the zoom lens has a high optical performance over the entire range of zoom and greatly mitigates ghost images by satisfying a first condition, and avoids unacceptable lateral chromatic aberrations by satisfying a second condition.

2 Claims, 9 Drawing Sheets

Embodiment 1

Embodiment 1

Embodiment 1

Embodiment 2
Wide-angle End
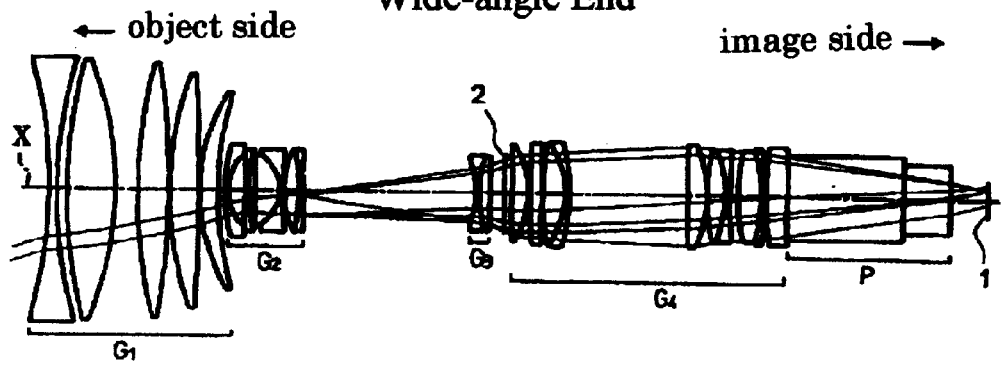
4 times magnification power ratio
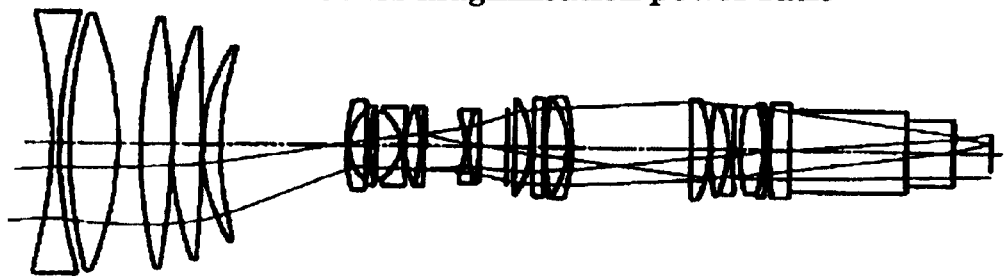
Telephoto End
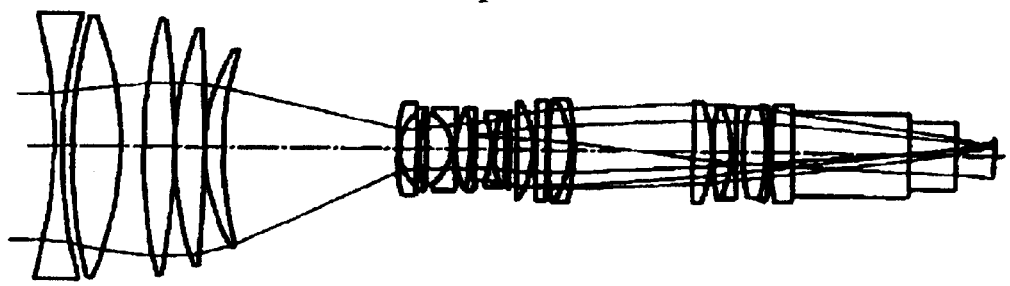
Fig. 6

PRIOR ART
2 times magnification power ratio
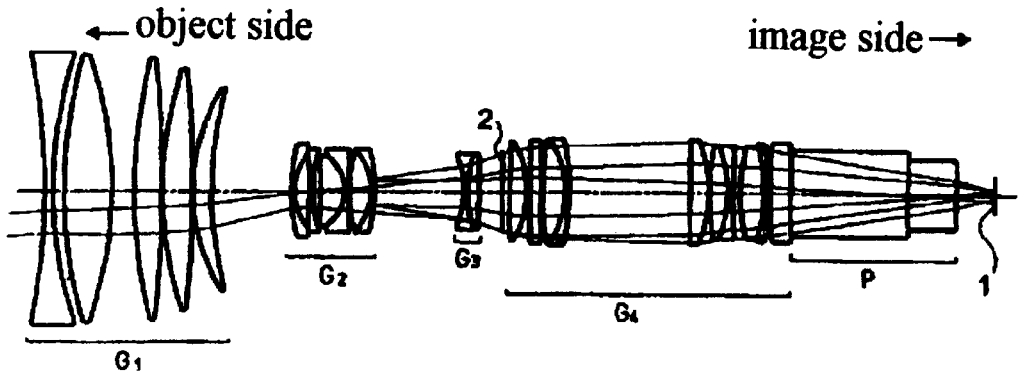
4 times magnification power ratio
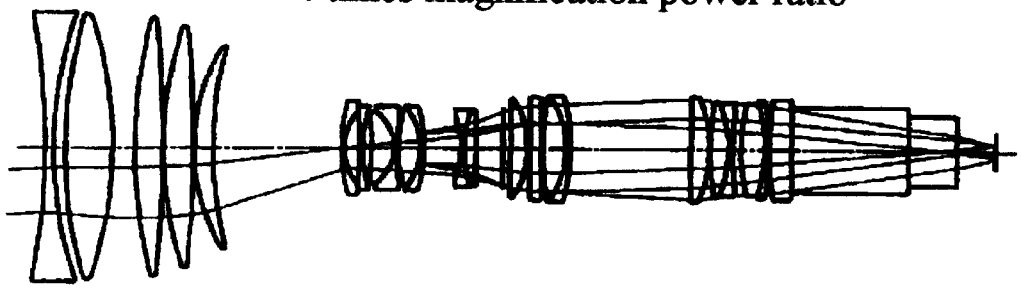
6 times magnification power ratio
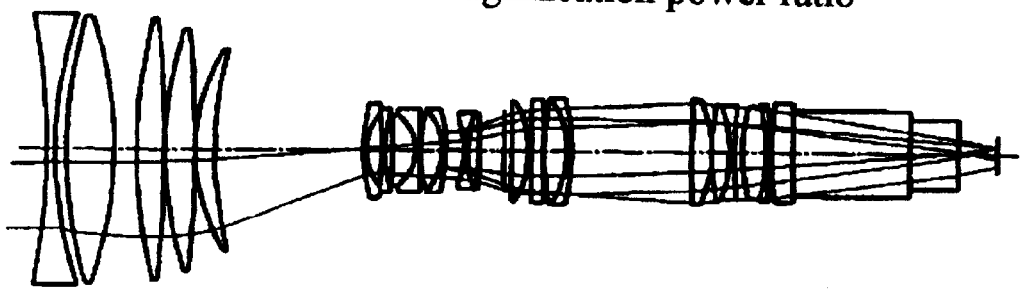
Fig.8

2 times magnification power ratio 4 times magnification power ratio 6 times magnification power ratio

ZOOM LENS

BACKGROUND OF THE INVENTION

A zoom lens used in a TV camera for broadcasting requires a high performance over the entire range of zoom and over the entire range of object distances. Furthermore, having a high zoom ratio, wide field angle, and a small size are also important features for such a zoom lens. Zoom lenses composed of four lens groups having, in order from the object side, positive, negative, negative and positive refractive power, respectively, and wherein the second lens group moves to vary the zoom ratio are disclosed in the following Japanese Laid Open Patent Applications H7-35976, H8-129134, H8-136808, and H10-161026. However, the above-mentioned prior art zoom lenses have a problem in that a ghost image is easily produced as a result of these lenses having a long exit pupil, and the ghost image that is produced adversely affects the image quality.

The ghost image appearing on conventional zoom lenses (as in the above-mentioned patent applications) is described hereinafter with reference to FIG. 8 and FIGS. 9(a)–9(c). FIG. 8 illustrates the lens element arrangement of such a conventional, four-group zoom lens at a zoom ratio of 2× (top), 4× (middle), and 6× (bottom). As illustrated in FIG. 8, ghost images are primarily the result of light that is reflected at the image surface then being incident on and reflected by the image side surface of the second lens group $G_2$. This reflected light is then re-imaged by third and fourth lens groups $G_3$ and $G_4$ onto the image surface to form the ghost image. FIGS. 9(a)–9(c) are enlarged views of the image surface for these three zoom ratios, and illustrate the photographic image point and the ghost image at magnification power ratios of 2×, 4× and 6×, respectively.

As shown in FIGS. 9(a)–9(c), the ghost image usually appears on the opposite side of the optical axis from the actual image as a result of the image light being reflected by a convex surface of the zoom lens. Further, the size of the ghost image varies when zooming from the wide-angle end to the telephoto end. Therefore, the appearance of the ghost image is a problem in that reflected light from the actual image is again incident onto the image surface. This is especially troublesome in the case of a zoom lens as used in a TV camera where the optical system has a long exit pupil in order to accommodate optical components, such as a color separating optical system, within the space between the back surface of the zoom lens and the image plane.

Of FIGS. 9(a)–9(c), the most serious adverse affect due to ghost image light degrading the image occurs in the case illustrated in FIG. 9(b), wherein the ghost image light at the image surface is most concentrated due to the ghost image light being nearly in focus at the image surface.

BRIEF SUMMARY OF THE INVENTION

The object of the present invention is to provide a zoom lens for a TV camera for broadcasting which has four-lens groups of positive, negative, positive or negative, and positive refractive power, in order from the object side, wherein the second lens group moves to vary the zoom ratio, the third lens group moves to compensate for movement of the image surface during zooming, and specified conditions are satisfied in order to greatly mitigate the adverse affect of ghost image light at the image surface.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 6 shows arrangements of the lens elements in accordance with a second embodiment of the invention, at the wide-angle end (top), at a magnification of 4× (middle), and at the telephoto end (bottom)

FIG. 8 shows a conventional arrangement of lens elements at a magnification of 2× (top), 4× (middle), and 6× (bottom)

DETAILED DESCRIPTION

Figure 1:
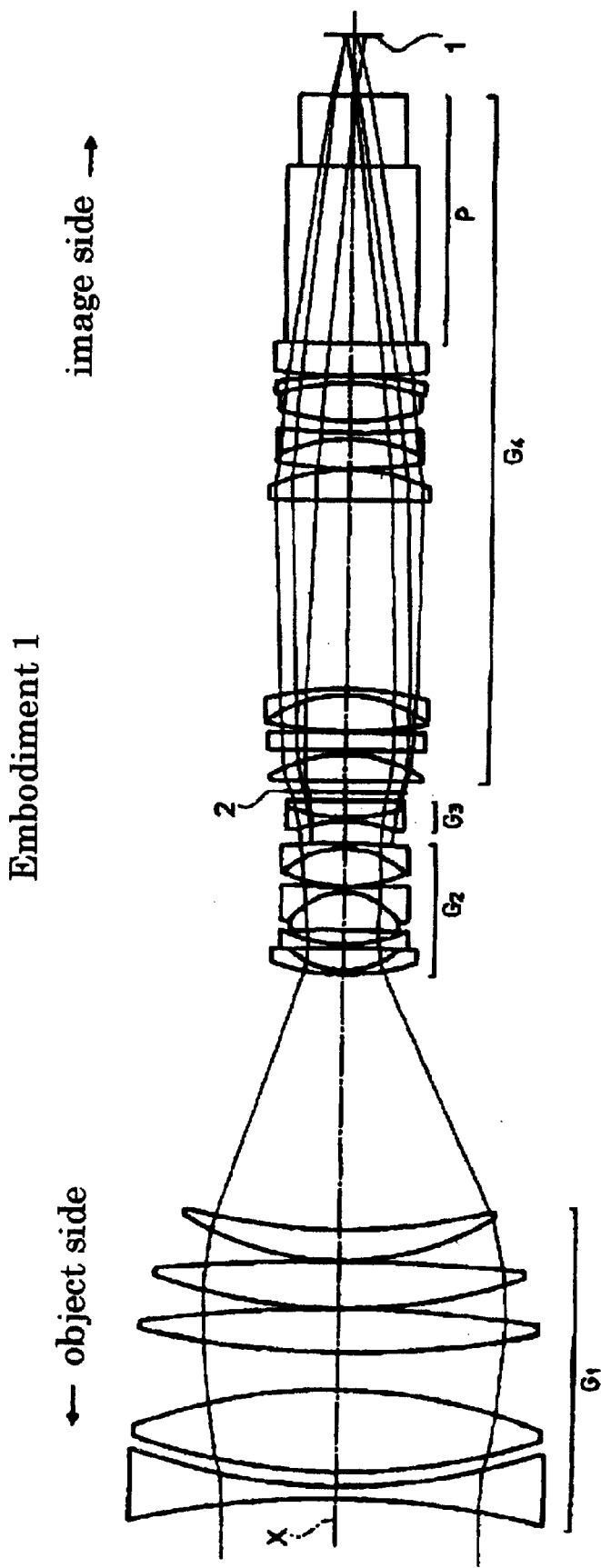
FIG. 1 shows the overall arrangement of components and the image surface of Embodiment 1 of the zoom lens of the invention.

The present invention will now be described with reference to the drawings. As shown in FIG. 1, a zoom lens having four lens groups $G_1$–$G_4$ are arranged sequentially, in order from the object side, along an optical axis X so as to form an image surface at 1. The first lens group $G_1$ has positive refractive power and is held stationary during zooming, the second lens group $G_2$ has negative refractive power and moves during zooming, the third lens group $G_3$ has either positive or negative refractive power and moves to prevent shifting of the image plane which otherwise would occur during zooming, and a fourth lens group $G_4$ that has positive refractive power and is held stationary during zooming.

A positive lens element and a negative lens element are arranged, in order from the object side, at the side of the second lens group $G_2$ that is nearest the image side, a stop 2 is placed between the third lens group $G_3$ and the fourth lens group $G_4$, and a color separating optical system P, formed of a tricolor splitting prism, is placed at the image side of the fourth lens group $G_4$.

Also, the zoom lens of the present invention is made so as to satisfy the following Conditions (1) and (2):

$|\Delta Xz| > 10$  Condition (1)

$98 \leq \nu_P + \nu_N \leq 105$  Condition (2)

where $|\Delta Xz|$ is the absolute value of $\Delta Xz$, where $\Delta Xz = Lz - R_{G2L} + Dz$, with:

Lz being the distance between the apex of the lens element surface on the most object-side of the third lens group $G_3$ and a conjugate point, said conjugate point being the image point that is formed by the synthesized lens groups $G_3$ and $G_4$ (having a focal length $f_{34}$) of an object point that is the on-axis position of the image surface of the zoom lens, the direction from said apex to the conjugate point being negative, $R_{G2L}$ being the radius of curvature of the lens surface nearest the image side of the second lens group $G_2$ (where the positive direction is defined as having the center of curvature located on the image side of the lens surface apex), Dz being the distance between the second lens group $G_2$ and the third lens group $G_3$ (where Dz>0), $\nu_P$ being the Abbe number at the d-line of the positive lens element on the image side of the second lens group $G_2$, and $\nu_N$ being the Abbe number at the d-line of the negative lens element on the image side of the second lens group $G_2$.

More specifically, Lz is the distance between the lens surface apex of the object side of the twelfth lens element $L_{12}$ (the surface having radius $R_{21}$) and the conjugate point to the on-axis image point of the zoom lens in the synthesized optical system formed of lens groups $G_3$ and $G_4$, $R_{G2L}$ is the radius of curvature $R_{20}$ of the image side of the eleventh lens element $L_{11}$, $D_z$ is the on-axis air separation between the second lens group $G_2$ and the third lens group $G_3$ (i.e., $D_{20}$), $\nu_P$ is the Abbe number at the d-line of the tenth lens element $L_{10}$, and $\nu_N$ is the Abbe number at the d-line of the eleventh lens element $L_{11}$.

Figure 4:
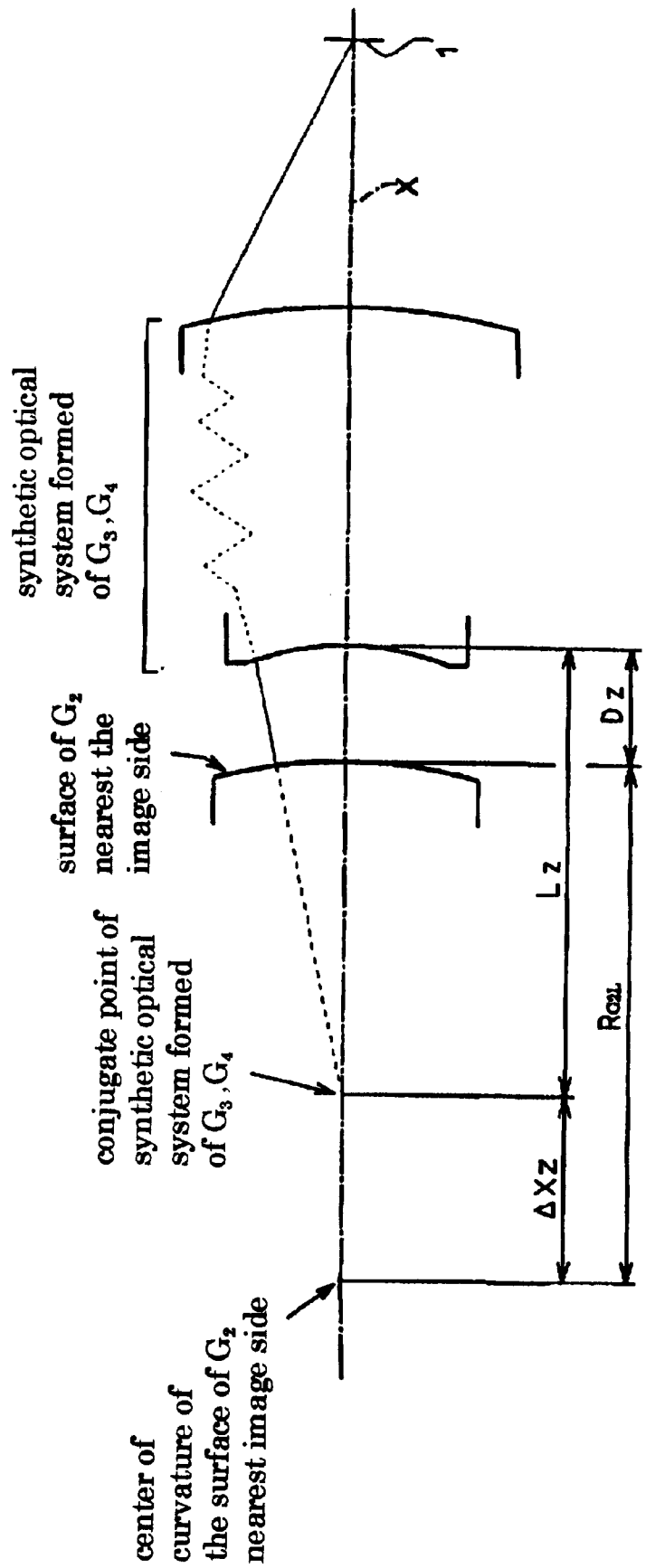
FIG. 4 is a schematic view of the optical system of the invention which illustrates how the value $\Delta Xz$ is determined.

Condition (1) gives that acceptable range for the absolute value $\Delta Xz$, where $\Delta Xz$ is defined as equal to $Lz - R_{G2L} + Dz$ at any arbitrary zoom position. FIG. 4 is a schematic illustration of the optical system for purposes of explaining the variable $\Delta Xz$.

Lz, $R_{G2L}$ and Dz, as defined above, are each indicated in FIG. 4. As shown in FIG. 4, $\Delta Xz$ represents the distance between the center of the curvature of the surface of the second lens group $G_2$ nearest the image side and a conjugate point, the conjugate point being conjugate to the intersection of the image surface of the zoom lens and the optical axis as imaged by the third and fourth lens groups, with the direction along the optical axis to the right being positive. Lz is the distance between the lens surface apex of the surface of the third lens group nearest the object side and said conjugate point. Condition (1) defines a minimum value for the absolute value of $\Delta Xz$. If the absolute value of $\Delta Xz$ does not exceed 10, a ghost image may be formed at the image surface which degrades the actual image.

By satisfying the Condition (1), even when the surface of the second lens group $G_2$ nearest the image side is convex, a ghost image does not result in an adverse effect on the photographic image, due to the reflected light that reaches the photographic image not being concentrated in a small region (i.e, the ghost image will not be sufficiently in focus at the image surface).

Condition (2) defines the range of the sum of the Abbe numbers of two lens elements positioned on the image-forming-side of the second lens group $G_2$. The two lens elements are a positive lens element $L_{10}$ and a negative lens element $L_{11}$, in order from the object-side. The upper limit value and the lower limit value indicate the region for suitable correction of lateral chromatic aberration during zooming. Further, correction of lateral chromatic aberration is improved when the positive and negative lens elements are cemented together to form a single unit.

Two embodiments of the invention will now be described in detail.

Embodiment 1

Figure 2:
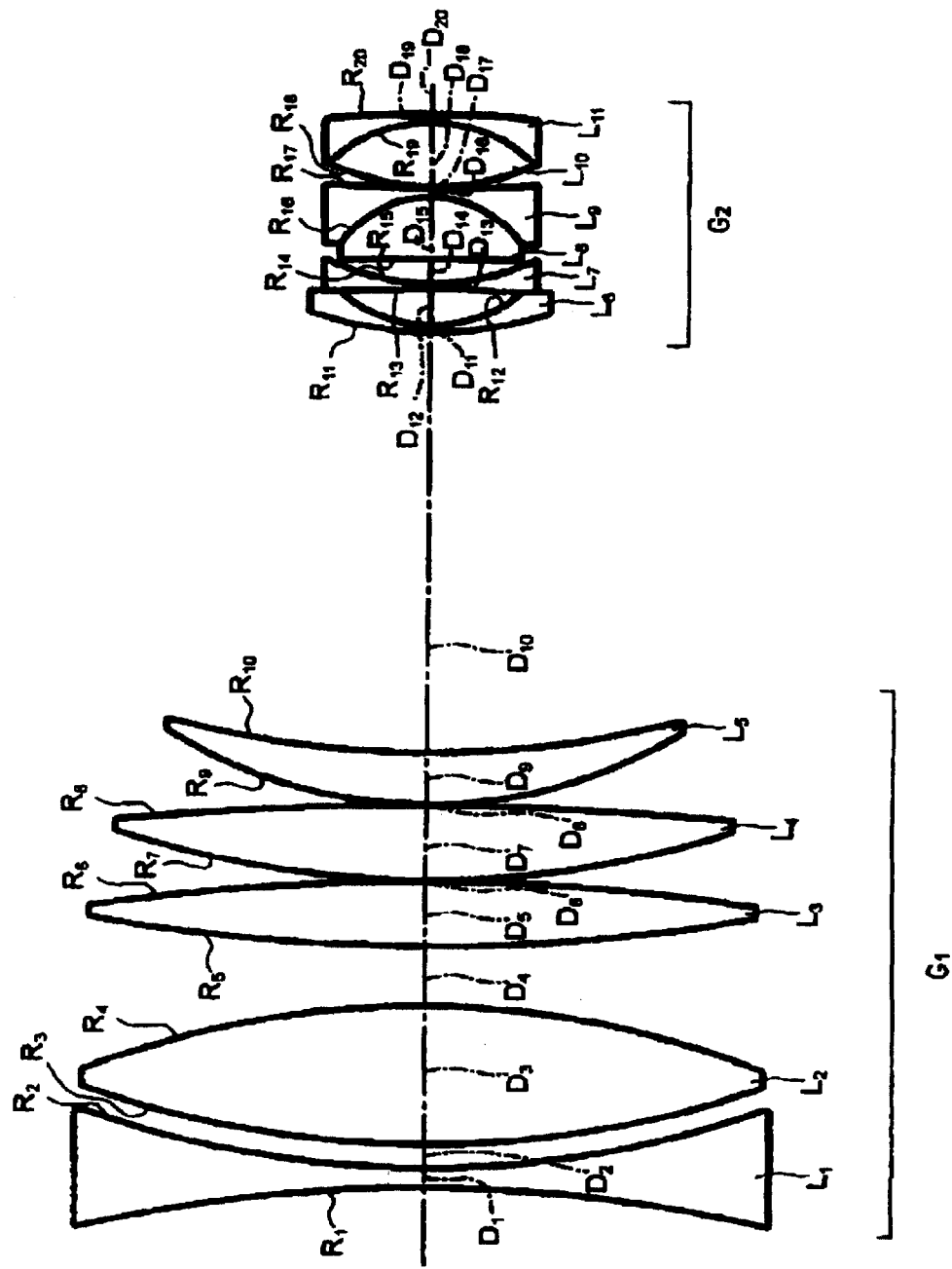
FIG. 2 is an enlarged view of the lens elements of the first lens group and the second lens group shown in FIG. 1.
Figure 3:
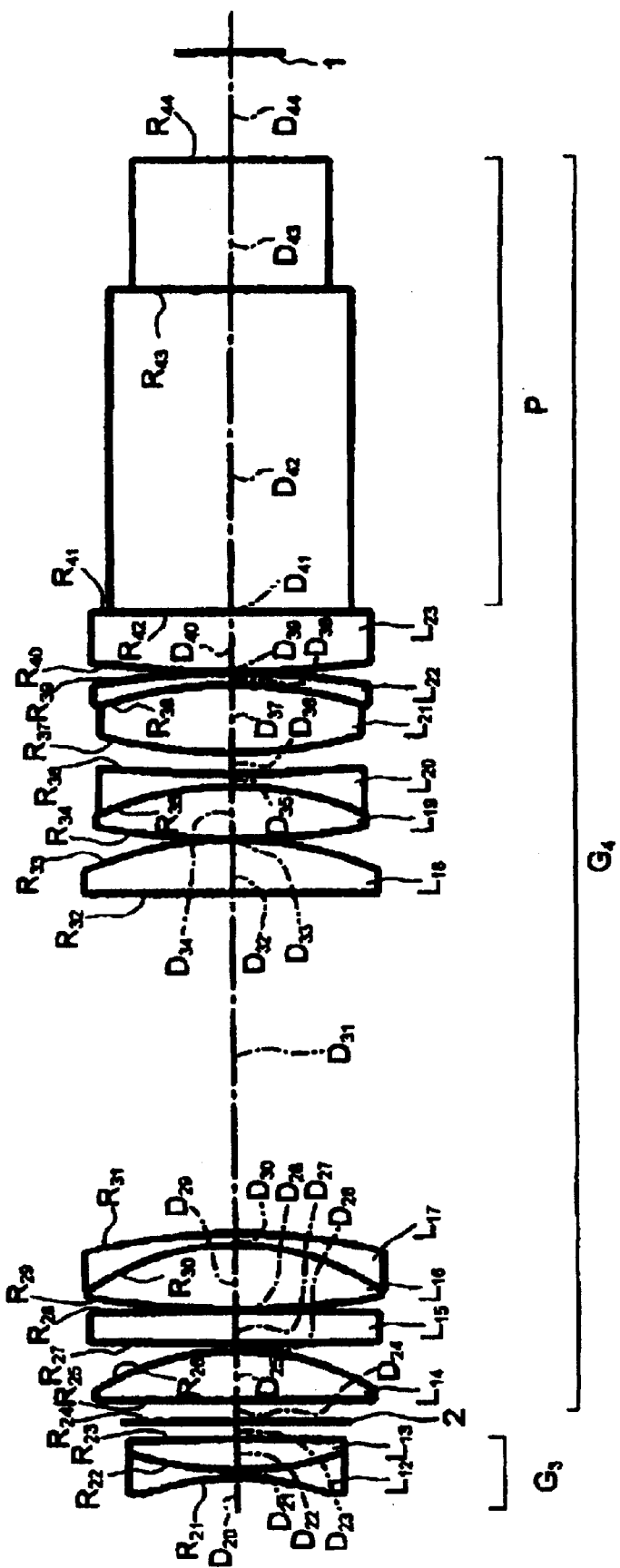
FIG. 3 is an enlarged view of FIG. 1, illustrating the remaining components of FIG. 1 not illustrated in FIG. 2 (i.e, the lens elements of the third lens group to the image surface) of the zoom lens of the invention.

The zoom lens in accordance with the first embodiment is illustrated in FIGS. 1 to 3, each illustrating the lens element positions when the zoom ratio is 14×. FIG. 1 is an overall view of the entire zoom lens, and FIG. 2 and Fig. 3 are expanded views of different portions illustrated in FIG. 1. As illustrated best in FIG. 2, the first lens group $G_1$ includes, in order from the object side, five lens elements, as follows: a biconcave first lens element $L_1$ having different radii of curvature on its opposite sides, with the surface of smaller radius of curvature on the image side; a biconvex second lens element $L_2$ having different radii of curvature on its opposite sides, with the surface of smaller radius of curvature on the image side; a biconvex third lens element $L_3$ having different radii of curvature on its opposite sides, with the surface of smaller radius of curvature on the object side; a biconvex fourth lens element $L_4$ having different radii of curvature, with the surface of smaller radius of curvature on the object side; and, a fifth lens element $L_5$ of positive meniscus shape with its convex surface on the object side.

The second lens group $G_2$ has six lens elements as follows, in order from the object side: a sixth lens element $L_6$ of negative meniscus shape with its convex surface on the object side; a seventh lens element $L_7$ that is biconcave with different radii of curvature on its opposite sides, with the smaller radius of curvature surface on the image side; an eighth lens element $L_8$ of positive meniscus shape with its convex surface on the image side, with this lens element joined to a ninth lens element $L_9$ that is biconcave with different radii of curvature, and with the surface of smaller radius of curvature on the object side; a tenth lens element $L_{10}$ that is biconvex with different radii of curvature on its opposite sides, with the surface of smaller radius of curvature on the image side and joined to an eleventh lens element $L_{11}$ of negative meniscus shape with its convex surface on the image side.

As best shown in FIG. 3, the third lens group $G_3$ is formed of a twelfth lens element $L_{12}$ of biconcave shape having opposite surfaces of different radii of curvature, with the surface of larger radius of curvature on the image side joined to a thirteenth lens element $L_{13}$ of biconvex shape with different radii of curvature, with the surface of stronger curvature on the object side.

The fourth lens group $G_4$ includes ten lens elements, as follows, in order from the object side: a fourteenth lens element $L_{14}$ that is plano-convex with its convex surface on the image side; a fifteenth lens element $L_{15}$ that is biconvex and has surfaces of different radii of curvature, with the surface of smaller radius of curvature on the image side; a sixteenth lens element $L_{16}$ that is biconvex and has surfaces of different radii of curvature, with the surface of smaller radius of curvature on the image side and joined to a seventeenth lens element $L_{17}$ of negative meniscus shape with its convex surface on the image side; an eighteenth lens element $L_{18}$ of positive meniscus shape with its convex surface on the image side; a nineteenth lens element $L_{19}$ of biconvex shape having different radii of curvature on its opposite sides, with the surface of smaller radius of curvature on the image side and joined to a twentieth lens element; a twentieth lens element $L_{20}$ that is biconcave with surfaces of different radii of curvature, with the surface of larger radius of curvature on the image side; a twenty-first lens element $L_{21}$ that is biconvex having different radii of curvature, with the surface of smaller radius of curvature on the image side and joined to a twenty-second lens element; a twenty-second lens element $L_{22}$ having a negative meniscus shape with its convex surface on the image side; a twenty-third lens element $L_{23}$ that is biconvex having different radii of curvature, with the surface of smaller radius of curvature on the object side, and a tricolor splitting optical system P.

Table 1 below gives the surface number # in order from the object side, the radius of curvature R (in mm) of each surface, the on-axis surface spacing D (in mm), as well as the index of refraction $N_d$ and the Abbe number $\nu_d$ (at the sodium d-line) for each lens element for Embodiment 1 of the present invention.

TABLE 1

| # | R | D | $N_d$ | $\nu_d$ |
|---|---|---|---|---|
| 1 | −170.779 | 2.25 | 1.80609 | 33.3 |
| 2 | 110.551 | 2.74 | 1.00000 | |
| 3 | 114.702 | 15.30 | 1.43387 | 95.1 |
| 4 | −107.381 | 8.22 | 1.00000 | |
| 5 | 203.571 | 7.44 | 1.43387 | 95.1 |
| 6 | −262.185 | 0.12 | 1.00000 | |
| 7 | 107.163 | 8.58 | 1.49700 | 81.5 |
| 8 | −388.986 | 0.12 | 1.00000 | |
| 9 | 53.779 | 5.90 | 1.71299 | 53.8 |
| 10 | 111.589 | D10 (variable) | 1.00000 | |
| 11 | 42.480 | 0.80 | 1.88299 | 40.7 |
| 12 | 16.051 | 4.03 | 1.00000 | |
| 13 | −320.728 | 0.78 | 1.81600 | 46.6 |
| 14 | 27.919 | 2.71 | 1.00000 | |
| 15 | −253.522 | 6.91 | 1.76182 | 26.5 |
| 16 | −12.577 | 1.00 | 1.78800 | 47.3 |
| 17 | 174.388 | 0.12 | 1.00000 | |
| 18 | 27.935 | 7.22 | 1.51741 | 52.4 |
| 19 | −17.164 | 1.00 | 1.78800 | 47.3 |
| 20 | −111.467 | D20 (variable) | 1.00000 | |
| 21 | −27.569 | 0.83 | 1.75699 | 47.8 |
| 22 | 34.813 | 3.11 | 1.80517 | 25.4 |
| 23 | −491.581 | D23 (variable) | 1.00000 | |
| 24 | ∞ (stop) | 2.19 | 1.00000 | |
| 25 | ∞ | 4.73 | 1.54814 | 45.8 |
| 26 | −28.382 | 0.85 | 1.00000 | |
| 27 | 1340.036 | 3.25 | 1.58913 | 61.2 |
| 28 | −793.647 | 0.25 | 1.00000 | |
| 29 | 86.071 | 6.70 | 1.48749 | 70.2 |
| 30 | −25.988 | 1.25 | 1.88299 | 40.7 |
| 31 | −59.841 | 35.00 | 1.00000 | |
| 32 | −3608.125 | 5.55 | 1.49700 | 81.5 |
| 33 | −36.522 | 0.12 | 1.00000 | |
| 34 | 76.680 | 5.32 | 1.48749 | 70.2 |
| 35 | −33.992 | 1.30 | 1.83400 | 37.1 |
| 36 | 143.387 | 2.20 | 1.00000 | |
| 37 | 53.351 | 6.88 | 1.48749 | 70.2 |
| 38 | −45.874 | 1.25 | 1.83480 | 42.7 |
| 39 | −82.899 | 0.12 | 1.00000 | |
| 40 | 111.106 | 6.11 | 1.48749 | 70.2 |
| 41 | −4752.247 | 0.00 | 1.00000 | |
| 42 | ∞ | 33.00 | 1.60859 | 46.4 |

TABLE 1-continued

| # | R | D | $N_d$ | $\nu_d$ |
|---|---|---|---|---|
| 43 | ∞ | 13.20 | 1.51633 | 64.0 |
| 44 | ∞ | 10.83 | 1.00000 | |

In Table 2, the values of the focal length f and the variables D10, D20, D23 (the spacings between the lens groups) are shown for the zoom lens at the wide-angle end, the mid-position, and at the telephoto end. Also shown are the values of Lz, $R_{G2L}$, Dz, $f_{34}$ and $|\Delta Xz|$ for this embodiment.

TABLE 2

| | Wide-angle end | Mid-position | Telephoto end |
|---|---|---|---|
| f | 8.3 | 33.2 | 120.4 |
| D10 | 0.49 | 33.18 | 46.29 |
| D20 | 47.64 | 10.65 | 4.26 |
| D23 | 3.63 | 7.92 | 1.21 |
| Lz | −79.95 | −51.53 | −105.5 |
| $R_{G2L}$ | −111.467 | −111.467 | −111.467 |
| Dz | 47.64 | 10.65 | 4.26 |
| $f_{34}$ | 39.78 | 36.76 | 41.71 |
| $|\Delta Xz|$ | 76.92 | 71.43 | 10.2 |

Furthermore, the range of values for Condition (1) and the value for Condition (2) above are shown below.

Condition (1) values: $|\Delta Xz|$=76.92−10.2

Condition (2) value: $\nu_P + \nu_N$=99.7

Thus, Conditions (1) and (2) are both satisfied.

Figure 5A:
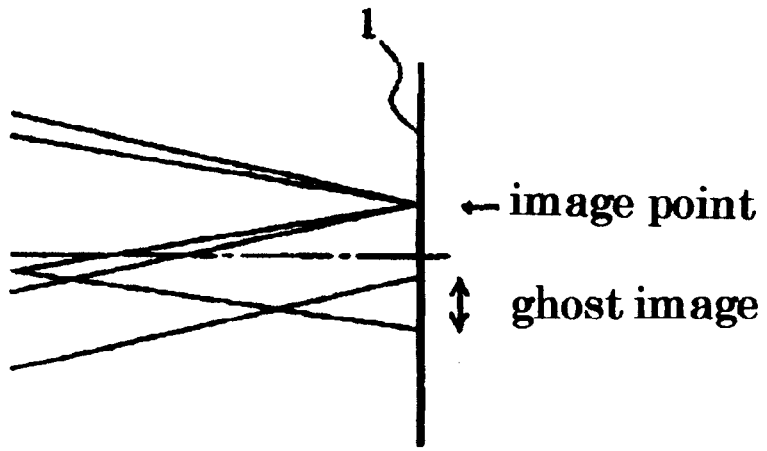
FIGS. 5(a) and 5(b) are enlarged views showing a photographic image point and the ghost image light incident on the image surface of a zoom lens according to the first embodiment of the invention, at a magnification of 14× and at the telephoto end, respectively.
Figure 5B:
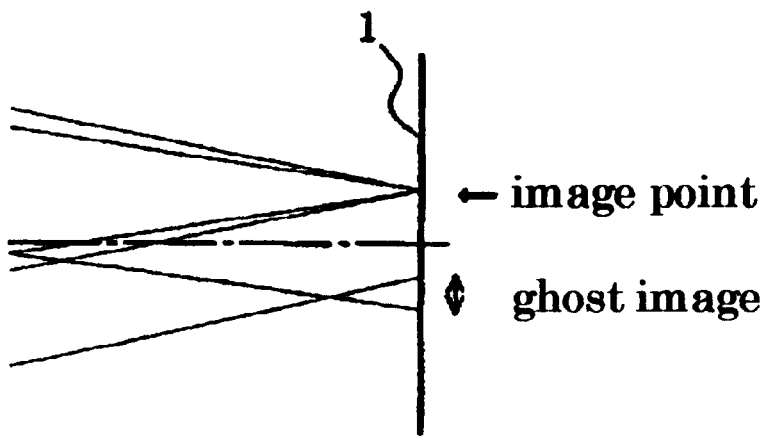

FIGS. 5(a)–5(b) are enlarged views showing the image point and the ghost image at the image surface of the zoom lens of Embodiment 1, with FIG. 5(a) illustrating a zoom ratio of 14×, and FIG. 5(b) illustrating the telephoto end position (zoom ratio equals 14.5×). As shown in both FIG. 5(a) and FIG. 5(b), the possible ghost images are in a diffused state at the image surface, and thus no ghost image is sharply focused. Therefore, there is little adverse affect on the image.

Embodiment 2

FIG. 6 shows the zoom lens of Embodiment 2, and illustrates the lens element arrangement at the wide-angle end (top), at a zoom magnification power ratio of 4×, and at the telephoto end (bottom).

The general arrangement of lens elements of this embodiment are the same as in the first embodiment except in the second lens group $G_2$. The second lens group $G_2$ in Embodiment 2 again includes six lens elements that are similar to that of the first embodiment except, in this embodiment, the eighth lens element $L_8$ is biconvex having different radii of curvature, with the surface having the smaller radius of curvature on the image side and is joined to the ninth lens element. The tenth lens element $L_{10}$ of this embodiment again is biconvex but has its larger radius surface on the image side and this surface is joined to the eleventh lens element. The eleventh lens element in this embodiment is biconcave. Thus, the surface of the second lens group $G_2$ nearest the image side (i.e, the image side of the eleventh lens element $L_{11}$) is concave. Because the radius of curvature $R_{G2L}$ has a positive value in Condition (1) above, as the absolute value of $\Delta Xz$ becomes larger the spot of light incident on the image side of the second lens group becomes larger. Thus, ghost images are less likely to be a problem.

Table 3 below gives the surface number # in order from the object side, the radius of curvature R (in mm) of each surface, the on-axis surface spacing D (in mm), as well as the index of refraction $N_d$ and the Abbe number $\nu_d$ (at the sodium d-line) for each lens element of Embodiment 2 of the present invention.

TABLE 3

| # | R | D | $N_d$ | $\nu_d$ |
|---|---|---|---|---|
| 1 | −147.183 | 2.25 | 1.80609 | 33.3 |
| 2 | 136.906 | 2.97 | 1.00000 | |
| 3 | 154.976 | 13.76 | 1.43387 | 95.1 |
| 4 | −102.979 | 8.11 | 1.00000 | |
| 5 | 158.046 | 8.88 | 1.43387 | 95.1 |
| 6 | −230.940 | 0.12 | 1.00000 | |
| 7 | 100.141 | 8.46 | 1.49700 | 81.5 |
| 8 | −609.028 | 0.12 | 1.00000 | |
| 9 | 54.859 | 5.23 | 1.71299 | 53.8 |
| 10 | 100.273 | D10 (variable) | 1.00000 | |
| 11 | 50.686 | 0.80 | 1.88299 | 40.7 |
| 12 | 13.819 | 5.09 | 1.00000 | |
| 13 | −574.995 | 0.78 | 1.81600 | 46.6 |
| 14 | 40.116 | 1.80 | 1.00000 | |
| 15 | 460.766 | 7.28 | 1.76182 | 26.5 |
| 16 | −12.577 | 1.00 | 1.78800 | 47.3 |
| 17 | 132.119 | 0.12 | 1.00000 | |
| 18 | 26.369 | 4.56 | 1.51823 | 58.9 |
| 19 | −51.103 | 1.00 | 1.78589 | 44.2 |
| 20 | 355.096 | D20 (variable) | 1.00000 | |
| 21 | −25.605 | 0.83 | 1.75699 | 47.8 |
| 22 | 33.701 | 3.20 | 1.80517 | 25.4 |
| 23 | −379.002 | D23 (variable) | 1.00000 | |
| 24 | ∞ (stop) | 2.19 | 1.00000 | |
| 25 | ∞ | 4.73 | 1.54814 | 45.8 |
| 26 | −28.382 | 0.85 | 1.00000 | |
| 27 | 1340.036 | 3.25 | 1.58913 | 61.2 |
| 28 | −793.647 | 0.25 | 1.00000 | |
| 29 | 86.071 | 6.70 | 1.48749 | 70.2 |
| 30 | −25.988 | 1.25 | 1.88299 | 40.7 |
| 31 | −59.841 | 35.00 | 1.00000 | |
| 32 | −3608.125 | 5.55 | 1.49700 | 81.5 |
| 33 | −36.522 | 0.12 | 1.00000 | |
| 34 | 76.680 | 5.32 | 1.48749 | 70.2 |
| 35 | −33.992 | 1.30 | 1.83400 | 37.1 |
| 36 | 143.387 | 2.20 | 1.00000 | |
| 37 | 53.351 | 6.88 | 1.48749 | 70.2 |
| 38 | −45.874 | 1.25 | 1.83480 | 42.7 |
| 39 | −82.899 | 0.12 | 1.00000 | |
| 40 | 111.106 | 6.11 | 1.48749 | 70.2 |
| 41 | −4752.247 | 0.0 | 1.00000 | |
| 42 | ∞ | 33.00 | 1.60859 | 46.4 |
| 43 | ∞ | 13.20 | 1.51633 | 64.0 |
| 44 | ∞ | 10.83 | 1.00000 | |

In Table 4, the values of the focal length f and the variables D10, D20, D23 (the spacings between the lens groups) are shown for the zoom lens at the wide-angle end, the mid-position, and at the telephoto end. Also shown are the values of Lz, $R_{G2L}$, Dz, $f_{34}$ and $|\Delta Xz|$ for this embodiment.

TABLE 4

| | Wide-angle end | Mid-position | Telephoto end |
|---|---|---|---|
| f | 8.3 | 33.2 | 120.2 |
| D10 | 0.48 | 34.78 | 48.63 |
| D20 | 50.01 | 10.65 | 4.93 |
| D23 | 4.18 | 7.80 | 1.11 |
| Lz | −84.21 | −56.1 | −125.5 |
| $R_{G2L}$ | 355.096 | 355.096 | 355.096 |
| Dz | 50.01 | 12.09 | 4.93 |
| $f_{34}$ | 38.76 | 36.16 | 41.27 |
| $|\Delta Xz|$ | 384.6 | 400.0 | 476.0 |

Furthermore, the range of values for Condition (1) and the value for Condition (2) in the second embodiment are as set forth below.

Condition (1) values: $|\Delta Xz|$=384.6–476.0

Condition (2) value: $\nu_P + \nu_N$=103.1

Thus, the above Conditions (1) and (2) are each satisfied.

Figure 7A:
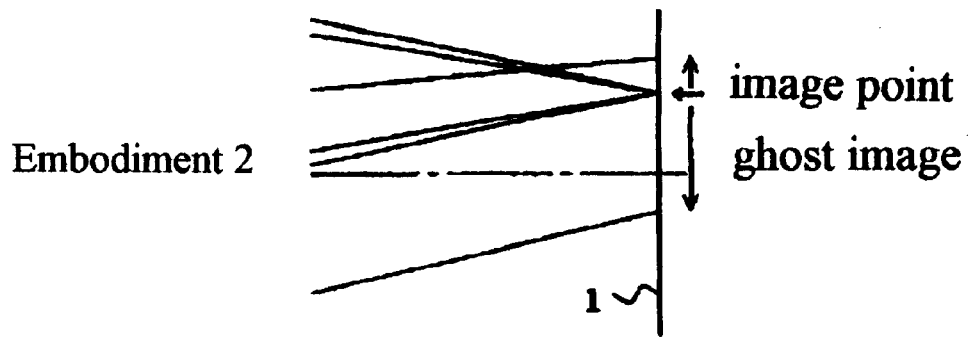
FIGS. 7(a)–7(c) are enlarged views showing an image point and the ghost image light incident on the image surface of a zoom lens according to a second embodiment of the invention, with FIG. 7(a) illustrating the condition of the zoom lens being at the wide-angle end, FIG. 7(b) illustrating the condition of the zoom lens magnification being 4× and FIG. 7(c) illustrating the condition of the zoom lens being at the telephoto end.
Figure 7B:
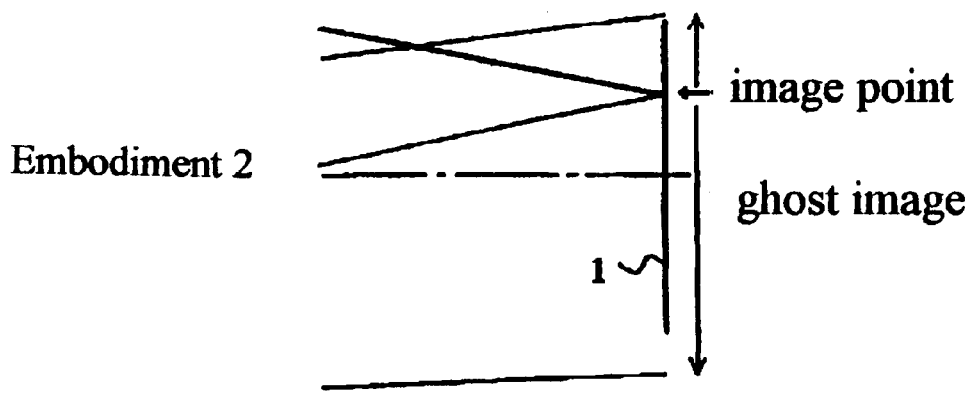
Figure 7C:
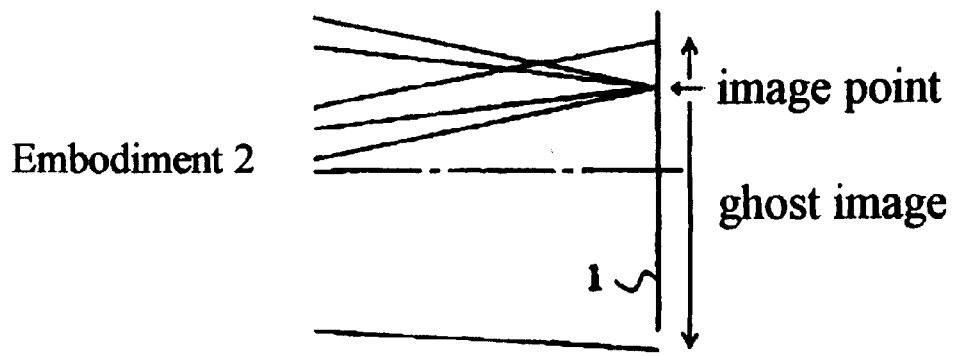
Figure 9A:
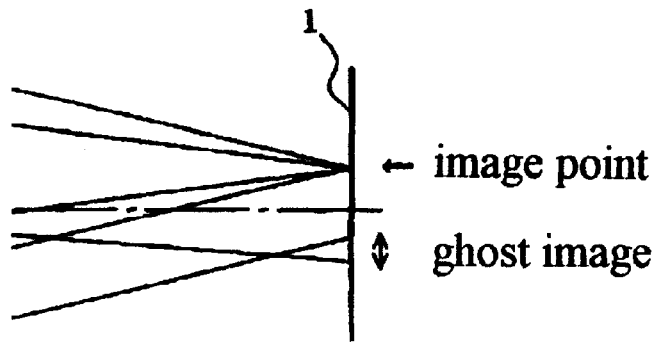
FIGS. 9(a)–9(c) are enlarged views showing an image point and the ghost image light on the image surface of a conventional lens, with FIG. 9(a) illustrating the condition of the zoom lens magnification being 2×, FIG. 9(b) illustrating the condition of the zoom lens magnification being 4×, and FIG. 9(c) illustrating the condition of the zoom lens magnification being 6×.
Figure 9B:
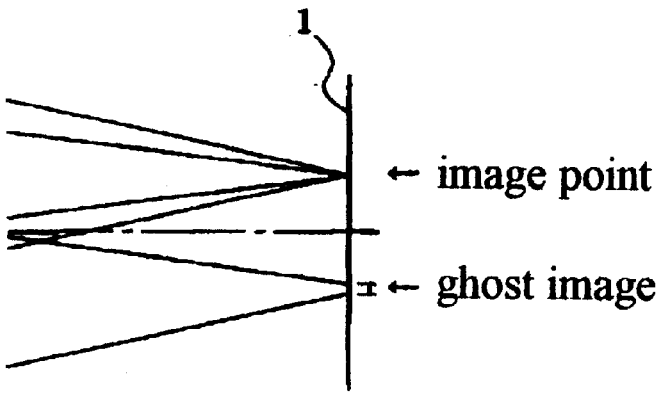
Figure 9C:
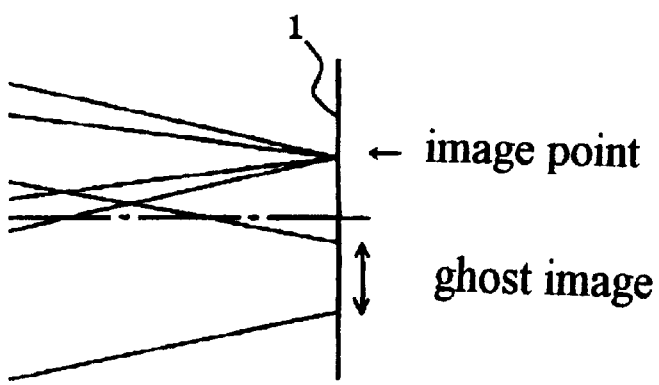

FIGS. 7(a)–7(c) are enlarged views showing the image point and the ghost image at the image surface in a zoom lens of the second embodiment, with FIG. 7(a) being an enlarged view at the wide-angle end, FIG. 7(b) being an enlarged view at a zoom ratio of 4× magnification, and FIG. 7(c) being an enlarged view at the telephoto end. As shown in each figure, the possible ghost image is diffused at the image surface and thus there is little adverse affect on the photographic image.

As described above, according to the zoom lens of the present invention, a zoom lens is provided that ensures that the distance from the center of the radius of curvature of the surface of the second lens group nearest the image to a conjugate point of the zoom lens as formed by the second and third lens groups exceeds a given value, said conjugate point being the image formed by the third and fourth lens groups of the on-axis position of the image surface of the zoom lens. Thus, light reflected at the image surface that is then incident on the side of the second lens group surface nearest the image surface is not focused or nearly focused and is instead rather diffused over the entire range of zoom positions from the wide-angle end to the telephoto end. Thus, the zoom lens of the present invention provides high performance imaging at any arbitrary zoom position over the entire field of view while greatly mitigating the adverse affect caused by ghost images.

The invention being thus described, it will be obvious that the same may be varied in many ways. For example, appropriate selection of the number of lens elements and their shapes are possible for the composition of each lens group. Such variations are not to be regarded as a departure from the spirit and scope of the invention. Rather, the scope of the invention shall defined as set forth in the following claims and their legal equivalents. All such modifications as would be obvious to one skilled in the art are intended to be included within the scope of the following claims.

What is claimed is:

1. A zoom lens comprising, in order from the object side:
   a first lens group which has positive refractive power and is held stationary at the time of zooming;
   a second lens group which has negative refractive power and which moves to change the focal length of the zoom lens during zooming;
   a third lens group which moves to compensate for what would otherwise be a variation in image surface position during zooming; and
   a fourth lens group which has positive refractive power and is held stationary during zooming,
   said zoom lens satisfying the following condition $|\Delta Xz|$>10.0 where $|\Delta Xz|$ represents the absolute value defined by $\Delta Xz = Lz - R_{G2L} + Dz$, with Lz being the distance between the lens surface apex of the surface of the third lens group nearest the object side and a conjugate point, said conjugate point being conjugate to the on-axis point of the image surface of the zoom lens as imaged by the third and fourth lens groups, the positive direction being along the optical axis toward the image side, $R_{G2L}$ being the radius of curvature of the lens element surface of the second lens group nearest the image side, with the positive direction being when the center of the curvature of the lens element surface is located on the image-forming-side of the lens surface, and with Dz being the distance between the second lens group and the third lens group.

2. The zoom lens as defined in claim 1, wherein said second lens group includes at least one positive lens element and at least one negative lens element nearest the image side of the second lens group which satisfy the following condition $$98 \leq v_P + v_N \leq 105$$

where $v_P$, is the Abbe value at the sodium d-line of said positive lens element and $v_N$ is the Abbe value at the sodium d-line of said negative lens element.

* * * * *

UNITED STATES PATENT AND TRADEMARK OFFICE
CERTIFICATE OF CORRECTION

PATENT NO.   : 6,285,510 B1
DATED        : September 4, 2001
INVENTOR(S)  : Tsutsumi It is certified that error appears in the above-identified patent and that said Letters Patent is hereby corrected as shown below:

Column 6,
Line 63, delete the comma after "$L_{11}$"; and

Column 10, claim 2,
Line 7, delete the comma after "$v_p$".

Signed and Sealed this

Fifth Day of March, 2002

Attest:

Attesting Officer

JAMES E. ROGAN
*Director of the United States Patent and Trademark Office*